United States Patent
Chalaud (10) Patent No.: US 10,072,578 B2
(45) Date of Patent: Sep. 11, 2018

(54) METHOD AND SYSTEM FOR INJECTING FUEL INTO AN ENGINE COMBUSTION CHAMBER

(71) Applicant: SAFRAN AIRCRAFT ENGINES, Paris (FR)

(72) Inventor: Sebastien Chalaud, Vincennes (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 14/912,523

(22) PCT Filed: Aug. 20, 2014

(86) PCT No.: PCT/FR2014/052105
§ 371 (c)(1),
(2) Date: Feb. 17, 2016

(87) PCT Pub. No.: WO2015/025109
PCT Pub. Date: Feb. 26, 2015

(65) Prior Publication Data
US 2016/0201919 A1 Jul. 14, 2016

(30) Foreign Application Priority Data

Aug. 20, 2013 (FR) .................................... 13 58078
Sep. 3, 2013 (FR) .................................... 13 58422

(51) Int. Cl.
*F02C 7/22* (2006.01)
*F02C 7/228* (2006.01)
(Continued)

(52) U.S. Cl.
CPC ................ *F02C 7/228* (2013.01); *F02C 9/34* (2013.01); *F23K 5/06* (2013.01); *F23R 3/34* (2013.01);
(Continued)

(58) Field of Classification Search
USPC ...... 701/100; 60/776, 39.094, 734, 740, 747, 60/778
See application file for complete search history.

(56) References Cited

U.S. PATENT DOCUMENTS 4,716,719 A * 1/1988 Takahashi ................ F02C 9/26
60/247
5,417,054 A * 5/1995 Lee ......................... F02B 77/04
239/406

(Continued)

FOREIGN PATENT DOCUMENTS

| EP | 1 770 333 A1 | 4/2007 |
| EP | 1 942 260 A2 | 7/2008 |
| EP | 2 026 002 A1 | 2/2009 |

OTHER PUBLICATIONS

International Search Report dated Dec. 3, 2014, in PCT/FR2014/052105 Filed Aug. 20, 2014.

(Continued)

*Primary Examiner* — Richard A Goldman
(74) *Attorney, Agent, or Firm* — Oblon, McClelland, Maier & Neustadt, L.L.P.

(57) ABSTRACT

A system of injecting fuel into the combustion chamber of an engine, including at least two fuel circuits, one permanent flow circuit and one intermittent flow circuit, fuel proportioning and distribution devices for proportioning fuel and distributing fuel between the two circuits and a controller. When an order to fill circuits with fuel after the circuit with intermittent flow has been drained is received, the controller is adapted to control the proportioning and distribution devices to obtain a predetermined fuel flow higher than the flow corresponding to the filling order and to supply the resulting surplus of fuel to the intermittent flow circuit for a predetermined duration.

9 Claims, 6 Drawing Sheets (51) Int. Cl.
  *F02C 9/34* (2006.01)
  *F23K 5/06* (2006.01)
  *F23R 3/34* (2006.01)
(52) U.S. Cl.
  CPC ............... *F23D 2900/00016* (2013.01); *F23R 2900/00004* (2013.01)

(56) References Cited

U.S. PATENT DOCUMENTS

| | | | | |
|---|---|---|---|---|
| 5,465,570 | A * | 11/1995 | Szillat | F02C 7/26 60/39.281 |
| 5,598,698 | A | 2/1997 | Szillat et al. | |
| 5,916,126 | A * | 6/1999 | Szillat | F02C 7/26 60/778 |
| 2004/0148937 | A1 * | 8/2004 | Mancini | F23R 3/343 60/740 |
| 2004/0255594 | A1 * | 12/2004 | Baino | F02C 9/26 60/773 |
| 2006/0218929 | A1 * | 10/2006 | Murakami | F02C 9/28 60/773 |
| 2008/0154474 | A1 * | 6/2008 | Iasillo | F02C 7/22 701/100 |
| 2009/0038312 | A1 * | 2/2009 | Hernandez | F23D 11/36 60/748 |
| 2016/0195020 | A1 * | 7/2016 | Bernard | F02C 7/228 60/776 |
| 2016/0201919 | A1 * | 7/2016 | Chalaud | F02C 7/228 701/100 |
| 2016/0298850 | A1 * | 10/2016 | Chalaud | F02C 7/228 |

OTHER PUBLICATIONS

French Search Report dated Jun. 19, 2014 in FR 1358078 Filed Aug. 20, 2013.

* cited by examiner

FIG. 7

METHOD AND SYSTEM FOR INJECTING FUEL INTO AN ENGINE COMBUSTION CHAMBER

TECHNICAL DOMAIN

This invention relates to injection of fuel into the combustion chamber of an engine, and particularly an aircraft engine.

It more particularly relates to supply of fuel to injectors in a combustion chamber with low emission of nitrogen oxides NOx.

STATE OF PRIOR ART

It is known that fuel can be injected into an engine combustion chamber through two injection circuits, to reduce the emission ratio of pollutants and particularly nitrogen oxides NOx. A circuit called the pilot circuit has a permanent flow optimised for low speeds. A circuit called the main circuit has an intermittent flow optimised for high speeds. It complements the fuel flow particularly to be able to achieve the power necessary for takeoff. The main circuit is not used permanently, it is used whenever there is need for additional engine thrust, and its flow may be zero or very low at some speeds.

Intermittent operation of the main circuit combined with the high temperatures occurring in the engine has the consequence of inducing undesirable decomposition or coking of stagnant fuel in the main circuit when the fuel flow in the main circuit is very low or is stopped.

Documents EP 1 770 333 and EP 2 026 002 issued by the applicant disclose multipoint injectors with two fuel circuits of this type.

It is known that the main circuit can be drained when it is not used, to eliminate this risk of fuel coking in the main circuit.

However, operation of the pilot circuit and the entire fuel injection system may be disturbed when the main circuit is used again after being drained. The supply system that comprises a regulation device that controls a fuel proportioning valve and a fuel distribution valve between the two circuits, then opens the distribution valve in the position controlled by the regulation corresponding to a required speed. Part of the fuel flow is then used to fill the main circuit and therefore is not injected into the combustion chamber at this moment.

This generates a temporary undersupply of fuel during the main circuit filling phase, a delay in the response of the main circuit and a risk that the required speed would be exceeded at the end of filling of the main circuit.

PRESENTATION OF THE INVENTION

The invention aims to solve problems according to prior art by disclosing a system for injection of fuel into a combustion chamber of an engine, comprising at least two fuel circuits, one at permanent flow and the other at intermittent flow, fuel proportioning and distribution devices for proportioning fuel and distributing fuel between the two circuits and a means of controlling these devices, the intermittent flow circuit possibly being drained, characterised in that when an order to fill circuits with fuel after the circuit with intermittent flow has been drained is received, the control means is adapted to:
 control the proportioning and distribution devices to obtain a predetermined fuel flow higher than the flow corresponding to the filling order and to supply the resulting surplus of fuel to the intermittent flow circuit for a predetermined duration.

With the invention, the fuel flow injected into the combustion chamber remains conforming with the expected flow for smooth operation, and particularly there is no undersupply of fuel due to filling of the intermittent flow circuit.

There is no delay in the response of the intermittent flow circuit and the required speed is not exceeded after filling the intermittent flow circuit.

According to a first embodiment of the invention, the fuel proportioning and distribution devices comprise a fuel proportioning valve and a fuel distribution valve, the proportioning valve being designed to control the fuel flow output to the intermittent and permanent flow circuits, and the distribution valve being capable of distributing fuel between the intermittent flow circuit and the permanent flow circuit. The proportioning valve and the distribution valve are connected in series between a fuel pump and the injection circuits.

According to a second embodiment of the invention, the fuel proportioning and distribution devices comprise a fuel proportioning valve for the permanent flow circuit and a fuel proportioning valve for the intermittent flow circuit. The two proportioning valves are then connected in parallel between the fuel pump and the injection circuits and proportion fuel for each circuit and distribute fuel between the two circuits.

According to one variant, the fuel injection system is also characterised in that following the reception of an order to fill circuits with fuel after the intermittent flow circuit has been drained, the control means is adapted to:
 compare the received set value with a set threshold and if the set value is higher than the set threshold,
 control the proportioning and distribution devices to fill the intermittent flow circuit before reaching an engine thrust threshold corresponding to a predetermined fuel distribution between the permanent flow circuit and the intermittent flow circuit.

The invention provides a robust solution so that the time to fill the intermittent flow circuit has no effect on acceleration of the engine.

With the invention, the need to use the intermittent flow circuit can be anticipated without filling it with fuel when it is not necessary.

Thus, the intermittent flow circuit remains in the drained state for as long as possible, which eliminates the risk of coking of stagnant fuel.

According to one preferred characteristic, the control means is adapted to determine the set threshold as a function of the engine thrust threshold, for a given point in the flight envelope.

According to one preferred characteristic, the control means is adapted to determine the engine thrust threshold as being the thrust point starting from which the intermittent flow circuit is used.

According to one preferred characteristic, the control means is adapted to determine the set value as a function of the position of the throttle actuated by a user.

The invention also relates to a method of injecting fuel into an engine combustion chamber, through an injection system comprising at least two fuel circuits, one permanent flow circuit and one intermittent flow circuit, fuel proportioning and distribution devices for proportioning fuel and distributing fuel between the two circuits and a control means for these devices, the intermittent flow circuit possibly being drained, characterised in that following reception of an order to fill the circuits with fuel after the intermittent flow circuit has been drained, it comprises the step to:

control the proportioning and distribution devices to obtain a predetermined fuel flow higher than the flow corresponding to the filling order and to supply resulting surplus fuel to the intermittent flow circuit, for a predetermined duration.

According to one variant, the fuel injection method is characterised in that when an order to fill the circuits with fuel after the intermittent flow circuit has been drained is received, it includes steps to:

compare the received set value with a set threshold, and if the set value is higher than the set threshold, control proportioning and distribution devices to fill the intermittent flow circuit before reaching a thrust point threshold corresponding to a predetermined distribution of fuel between the permanent flow circuit and the intermittent flow circuit.

The method has advantages similar to those presented above.

In one particular embodiment, steps in the method according to the invention are implemented by instructions in a computer program.

Consequently, the invention also relates a computer program on a data medium, this program being usable in a computer, this program including instructions adapted to implementation of steps in a method like that described above.

This program may use any programming language, and may be in the form of a source code, object code or intermediate code between source code and object code, such as in a partially compiled form, or it may be in any desirable form.

The invention also relates to a data medium that can be read by a computer, comprising computer program instructions adapted to implement steps in a method like that described above.

The data medium may be any entity or device capable of storing the program. For example, the medium may comprise a storage means such as a ROM, for example a CD ROM or a ROM in a microelectronic circuit, or a magnetic recording means, for example a diskette or a hard disk.

The data medium may also be a transmittable medium such as an electrical or optical signal, that may be routed through an electrical or optical cable, by radio or other means. In particular, the program according to the invention may be downloaded on an Internet type network.

Alternatively, the data medium may be an integrated circuit in which the program is integrated, the circuit being adapted to implement or to be used in implementing the method according to the invention.

BRIEF DESCRIPTION OF THE DRAWINGS

Other characteristics and advantages will become clear after reading the following description of two preferred embodiments given as non-limitative examples described with reference to figures in which.

DETAILED PRESENTATION OF PARTICULAR EMBODIMENTS

Figure 1:
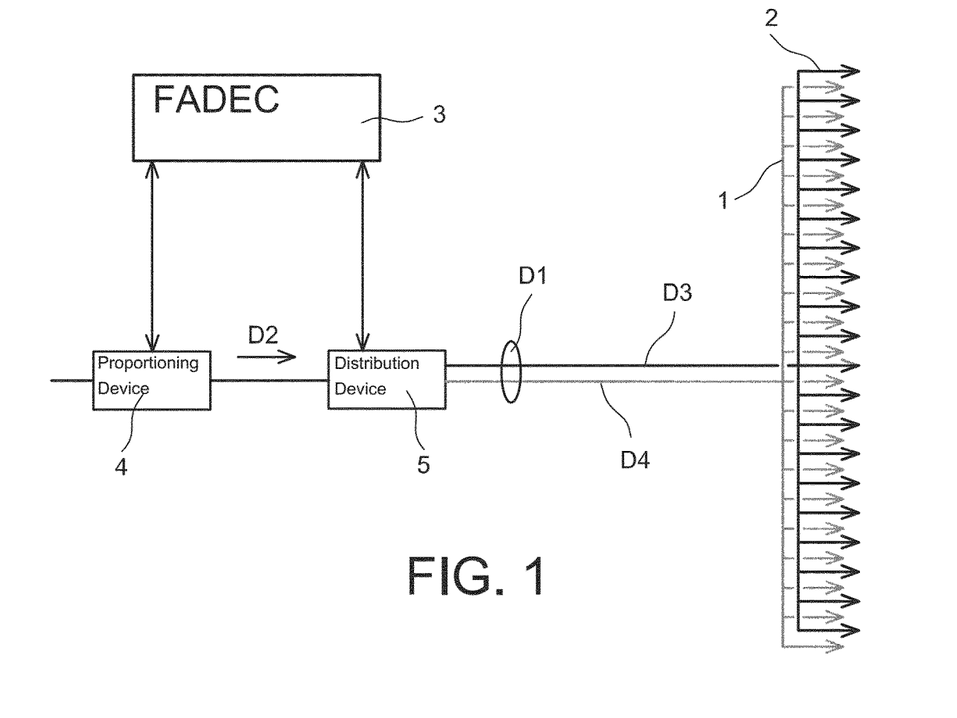
FIG. 1 diagrammatically shows a system for the injection of fuel into an engine combustion chamber, according to a first embodiment of the invention.

According to a first preferred embodiment of the invention shown with reference to FIG. 1, the invention applies to a system for injecting fuel into an engine combustion chamber. In particular, an aircraft engine is considered.

Only elements useful for understanding the invention are shown and described.

The injection system comprises two circuits for injecting fuel into the combustion chamber, not shown.

The first fuel injection circuit 1, called the pilot circuit or the idle circuit, has a limited and permanent flow. It comprises a set of injection nozzles symbolised by arrows.

The second fuel injection circuit 2 called the main circuit, is designed to complement the fuel flow up to the full throttle point. It is sufficient to reach the full power necessary for takeoff. This circuit also comprises a set of injection nozzles symbolised by arrows but it is not used permanently, and consequently its flow is intermittent and may be zero or very low at some engine speeds.

The fact that two fuel injection circuits can be used, one of which is not used permanently, can give better uniformity of the air/fuel mix and therefore better combustion. Therefore, this reduces the emission of pollutants, and particularly nitrogen oxides.

An electronic control device 3 called a FADEC «Full Authority Digital Engine Control», controls a fuel proportioning device 4 that determines the fuel flow supplied to the two injection circuits 1 and 2.

The control device 3 also controls a fuel distribution device 5 distributing fuel between the two injection circuits 1 and 2.

Thus, according to this embodiment, the proportioning device 4 is a proportioning valve that imposes the fuel flow supplied to the two injection circuits together. The distribution device 5 is a distribution valve that distributes fuel between the two injection circuits. The proportioning valve 4 and the distribution valve 5 are connected in series between a fuel pump not shown and the two injection circuits 1 and 2. Therefore fuel proportioning is determined firstly globally for the two circuits and then fuel is distributed between the two circuits.

Figure 2:
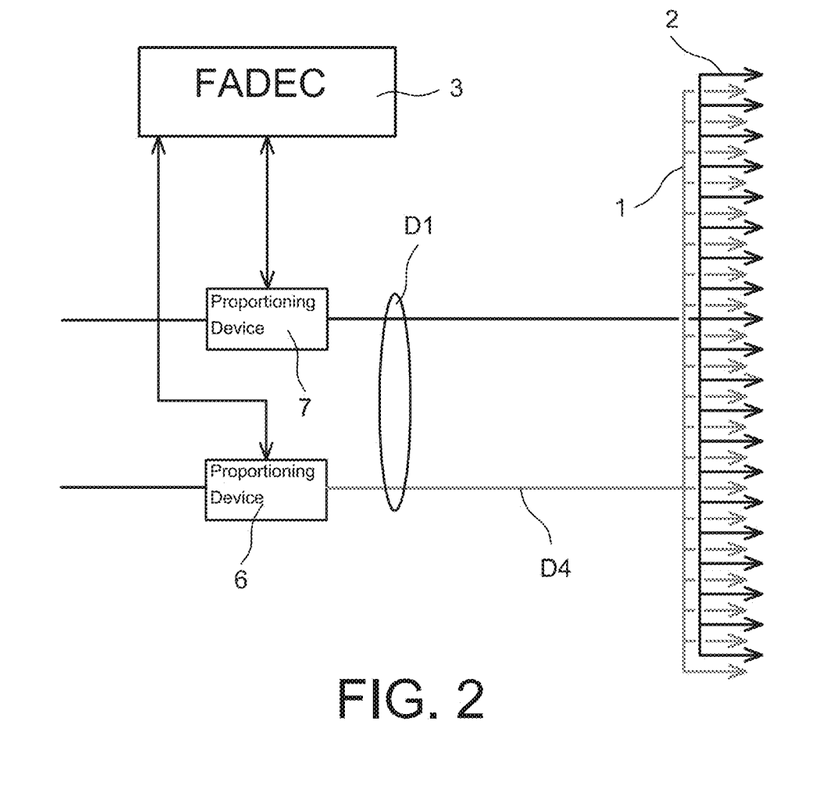
FIG. 2 diagrammatically shows a system for the injection of fuel into an engine combustion chamber, according to a second embodiment of the invention.

FIG. 2 shows a second embodiment of the fuel injection system. This second embodiment is different from the first embodiment due to its fuel proportioning and distribution devices.

The injection system comprises two fuel injection circuits 1 and 2 similar to those disclosed above. It also comprises a control device 3 similar to that disclosed above. It comprises fuel proportioning and distribution devices 6 and 7 between the two circuits 1 and 2.

In this embodiment, the proportioning device and the distribution device are two proportioning valves 6 and 7 controlled by the control device 3.

Thus, the proportioning valves 6 and 7 are connected in parallel between the fuel pump not shown and the injection circuits 1 and 2, respectively. Each proportioning valve 6, 7 imposes the fuel flow supplied to its corresponding injection circuit 1, 2 and the ratio of fuel flows supplied to the injection circuits determines the distribution between the injection circuits. Each proportioning valve is thus a fuel proportioning and distribution device.

The main circuit 2 is drained to prevent coking of fuel in the nozzles of the main circuit when no fuel flow from them into the combustion chamber. Draining is controlled by the electronic control device 3 and may be done in different ways.

According to variants not shown, the two fuel injection system embodiments may comprise more than two injection circuits. At least one fuel injection circuit can be drained in all cases.

Figure 3:
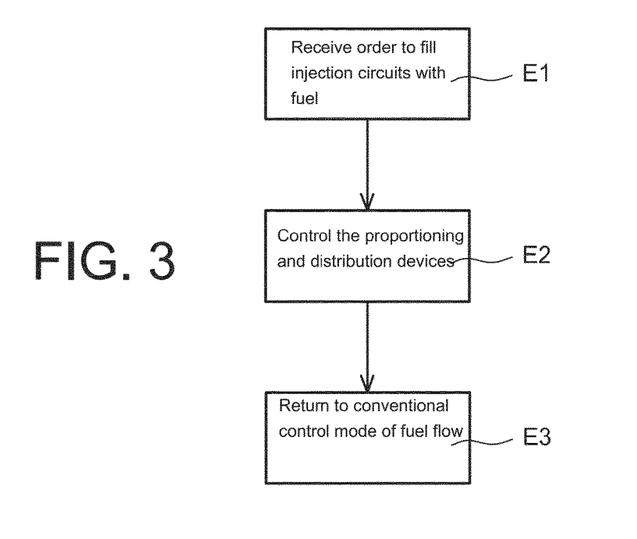
FIG. 3 diagrammatically shows a method for the injection of fuel into an engine combustion chamber, according to one embodiment of the invention.

FIG. 3 shows a method of injecting fuel into an engine combustion chamber, used in the first embodiment of the device described above, and more particularly in the electronic control device 3. The method includes steps E1 to E3.

Step E1 is reception of an order to fill injection circuits with fuel, after the intermittent flow circuit 2 has been drained. It is assumed that the filling order occurs at time T1.

Figure 4A:
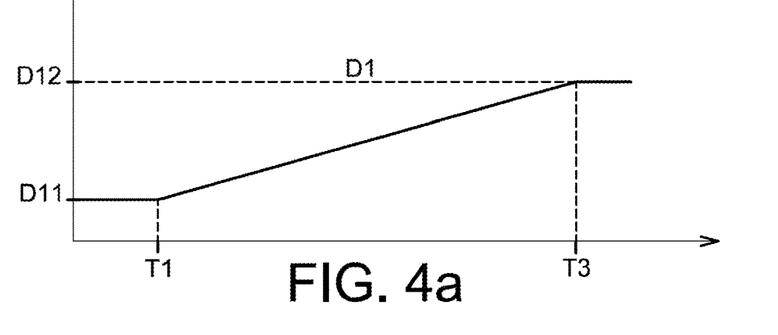
FIGS. 4*a* to 4*f* show fuel flows at different points in the system and a fuel distribution between the injection circuits, according to this invention.

FIG. 4*a* shows an example of the total fuel flow D1 delivered to the combustion chamber by the injection circuits, as a function of time, as a result of the received filling order. The total fuel flow delivered into the combustion chamber is equal to a relatively low first value D11 until time T1 and then increases up to a second value D12 higher than the first value, between times T1 and T3. The flow D1 then remains equal to the second value D12. For example, the value D11 is equal to 750 kg/h, the value D12 is equal to 3000 kg/h and the duration T3-T1 is equal to 7 seconds.

The next step E2 is to control the proportioning and distribution devices 4 and 5 such that the proportioning device 4 outputs a predetermined fuel flow D2 that is higher than the flow D1 corresponding to the filling order for a predetermined duration, and supplies the resulting surplus fuel to the intermittent flow circuit 2 for a predetermined duration. This surplus fuel corresponding to the difference between flows D2-D1 is used to fill the main circuit 2.

Figure 4B:
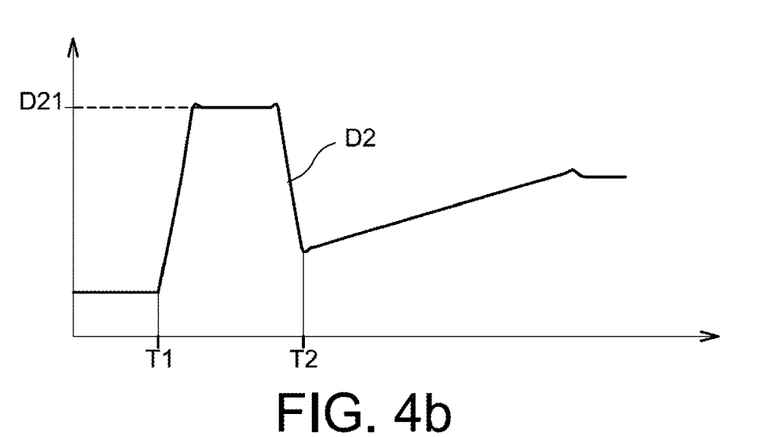

FIG. 4*b* shows the fuel flow D2 delivered by the proportioning valve 4, as a function of time. The fuel flow D2 delivered by the proportioning valve between times T1 and T2 is higher than the total fuel flow D1 delivered into the combustion chamber by the injection circuits, shown in FIG. 4*a*. Thus, the fuel flow D2 reaches a maximum value D21 higher than the flow value D1, between times T1 and T2. Time T1 is the time at which the filling order is received, as described above, and time T2 is the time at which the main circuit 2 is full of fuel. Time T2 is earlier than time T3. For example, duration T2-T1 is equal to 4 seconds and the flow value D21 is equal to 4500 kg/h.

Figure 4C:
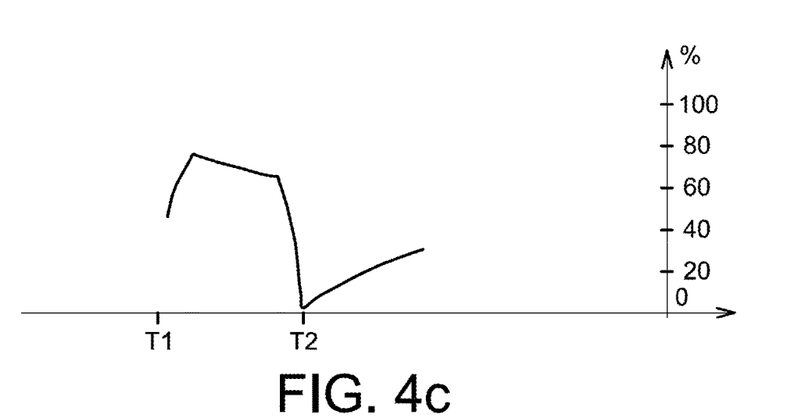

FIG. 4*c* shows the fuel distribution assigned to the main circuit 2, as a function of time. This distribution is determined by the distribution valve 5 and is shown as a percentage.

The fuel distribution between times T1 and T2 increases quickly, up to about 80% for the main circuit 2, and then reduces to a value close to zero. As a result of this distribution, the main circuit is filled due to the surplus fuel delivered by the proportioning valve 4.

The duration (T2-T1), the flow value D2 between times T1 and T2 and the distribution between the two fuel injection circuits between these two times are predetermined. These magnitudes depend on the composition of the main circuit 2, and particularly the volume to be filled with fuel.

Therefore the main circuit 2 is filled with fuel due to the combination of the surplus fuel flow at the output from the proportioning valve 4 and the simultaneous distribution made by the distribution valve 5 that sends surplus fuel to the main circuit 2. The fuel flow that fills the main circuit is the difference between the flow D2 delivered by the proportioning valve and the flow D1 delivered into the combustion chamber.

Figure 4D:
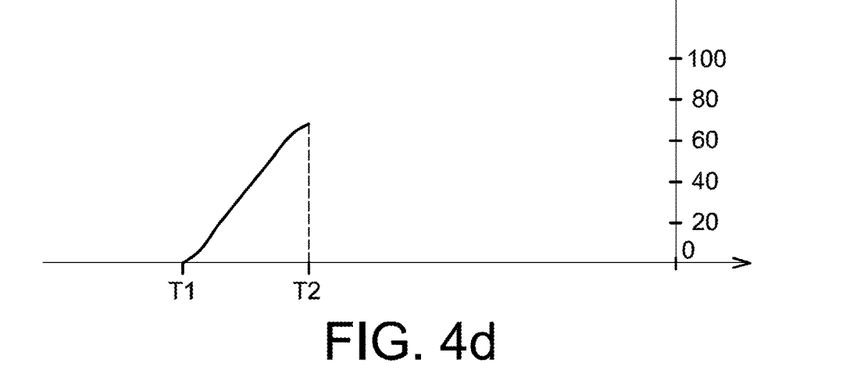

FIG. 4*d* shows the fuel filling curve for the main circuit 2, expressed as a percentage of the volume of the main circuit, as a function of time.

The main circuit 2 is full of fuel starting at time T2. At this moment, step E3 represents a return to a conventional control mode in which the fuel flow D2 at the output from the proportioning valve 4 is equal to the fuel flow D1 delivered into the combustion chamber, and in which the distribution valve 5 is adjusted such that flow D3 delivered by the main circuit 2 increases progressively.

Figure 4E:
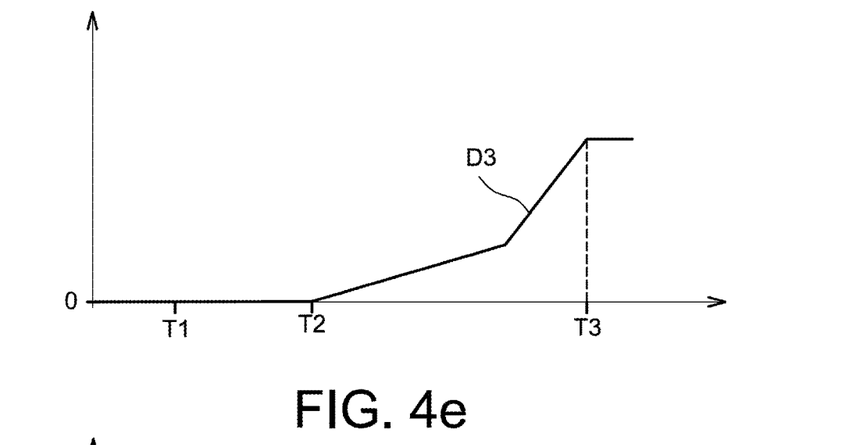
Figure 4F:
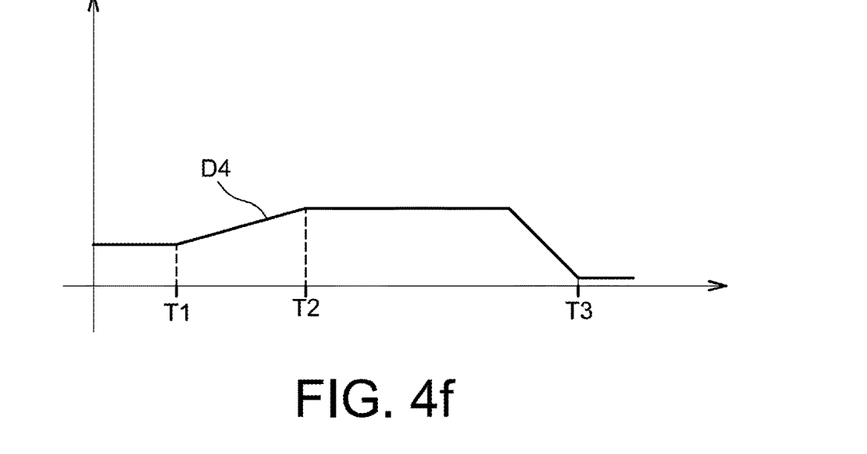

FIG. 4*e* shows the flow D3 delivered by the main circuit 2, as a function of time, while FIG. 4*f* shows the flow D4 delivered by the pilot circuit 1, as a function of time. Flow D4 in the pilot circuit is equal to the total flow D1 between times T1 and T2, then there is a plateau value for this flow, and the value then drops again to a low value. Flow D3 is zero until time T2 and then increases. Flow D1 is equal to the sum of flows D3 and D4 at each moment.

In the second embodiment, the two fuel injection circuits are supplied in parallel. The total fuel flow delivered into the combustion chamber is identical to the total flow D1 shown in FIG. 4*a*. The fuel flow delivered by the pilot circuit 1 is identical to the flow D4 shown in FIG. 4*f*.

The fuel flow output to the main circuit 2 is equal to the difference between the flow D2 (FIG. 4*b*) and the flow D1 (FIG. 4*a*), between times T1 and T2, and is then equal to flow D3 (FIG. 4*e*) starting from time T2.

Figure 5:
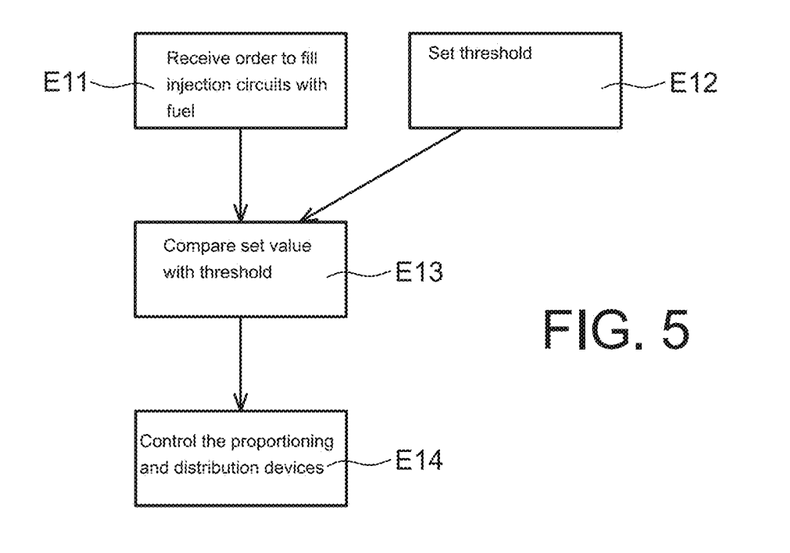
FIG. 5 shows another method of injecting fuel into an engine combustion chamber, according to one variant embodiment of the invention.

FIG. 5 shows another method for injecting fuel into an engine combustion chamber, used in the embodiment of the system described above, and more particularly in the electronic control device 3. The method includes steps E11 to E14.

Step E11 is reception of an order to fill injection circuits with fuel, after the intermittent flow circuit 2 has been drained. It is assumed that the filling order is given at time T11.

The order to fill injection circuits with fuel corresponds to an engine thrust set value determined by the position of the throttle actuated by a user.

Figure 6:
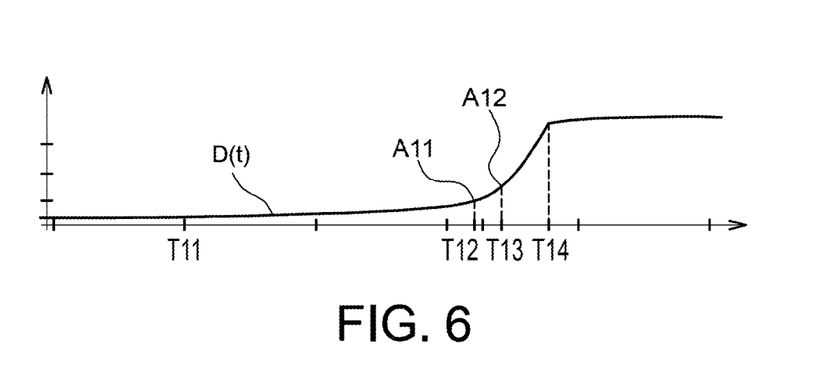
FIG. 6 shows an example fuel flow that might be obtained with the method in FIG. 5 according to this invention.

FIG. 6 shows an example of the total fuel flow D(t) delivered into the combustion chamber by the injection circuits 1 and 2, as a function of time, corresponding to the received filling order. The total fuel flow delivered into the combustion chamber is equal to a first relatively low value D11 until time T11 at which the order to fill injection circuits with fuel is received, and then it increases to a second value D12 higher than the first, between times T11 and 114. The flow D(t) then remains equal to the second value D12. For example, value D11 is equal to 750 kg/h, value D12 is equal to 3000 kg/h and the duration T14-T11 is equal to 7 seconds.

A total fuel flow threshold A11 is determined on this curve. The threshold A11 is the flow corresponding to a predetermined distribution of fuel between the permanent flow circuit and the intermittent flow circuit. The flow threshold A11 corresponds to an engine thrust threshold.

Preferably, the flow threshold A11 is the flow starting from which the intermittent flow circuit is used. Only the permanent flow circuit 1 is in use when the fuel flow is less than or equal to the flow threshold, in other words for an engine thrust less than or equal to the engine thrust threshold. The intermittent flow circuit 2 also starts to be sought starting from the flow threshold, in other words the thrust threshold.

The fuel threshold A11 is achieved at time T12.

It should be noted that the thrust point corresponding to the flow threshold A11 is at an intermediate level between ground idle thrust and takeoff thrust.

As a variant, the flow threshold and therefore the engine thrust threshold is chosen to correspond to another predetermined fuel distribution between the permanent flow circuit and the intermittent flow circuit. In all cases, this other distribution depends on the use of the intermittent flow circuit.

Flow A12 is the maximum flow that can pass in the permanent flow circuit. Flow A12 is reached at time T13 greater than T12. For example, the duration (T13-T12) may be equal to 0.6 seconds.

According to prior art, the previously drained intermittent flow circuit remains empty until time T12 when it is first in demand. The intermittent flow circuit then has to be filled before it can deliver fuel into the combustion chamber. Filling the intermittent flow circuit takes a minimum time that is longer than the duration (T13-T12). For example, the filling time of the intermittent flow circuit is 2 seconds. The intermittent flow circuit is not functional until it has been filled with fuel.

Therefore, according to prior art, there is a time period starting from time T13 during which the fuel flow injected into the combustion chamber is limited to the value A12 reached at this instant.

The electronic control device 3 determines a set threshold B in step E12.

For a given point on the flight envelope, the set threshold is determined as a function of the engine thrust threshold, in other words the flow threshold A11 corresponding to the predetermined distribution of fuel between the permanent flow circuit and the intermittent flow circuit. Remember that the flow threshold A11 is preferably the flow starting at which the intermittent flow circuit is used.

The set threshold at a given point in the flight envelope is the set value at which it is possible to reach the thrust value equal to the thrust threshold.

The set threshold B varies as a function of the point in the aircraft flight envelope, and this is why the control device 3 calculates it permanently.

Step E11 is followed by step E13 that compares the received set value with the current set threshold B output from step E12.

If the received set value is less than the set threshold B, then the electronic control device 3 controls the proportioning valve and the distribution valve conventionally.

If the received set value is greater than the set threshold B, then step E13 is followed by step E14 that controls the proportioning and distribution devices 4, 5 to fill the intermittent flow circuit 2 before the thrust point threshold is reached. This means that crossing of the engine thrust threshold, in other words crossing of the flow threshold A11, is anticipated. Therefore the intermittent flow circuit is filled with fuel in advance, before it is actually used.

Thus, filling of the intermittent flow circuit starts at time T11, or as a variant at a time between times T11 and (T12-DR), where DR is the duration for filling the intermittent flow circuit 2, such that the intermittent flow circuit is full of fuel and is ready to deliver fuel into the combustion chamber at time 112 at which it is in demand.

Figure 7:
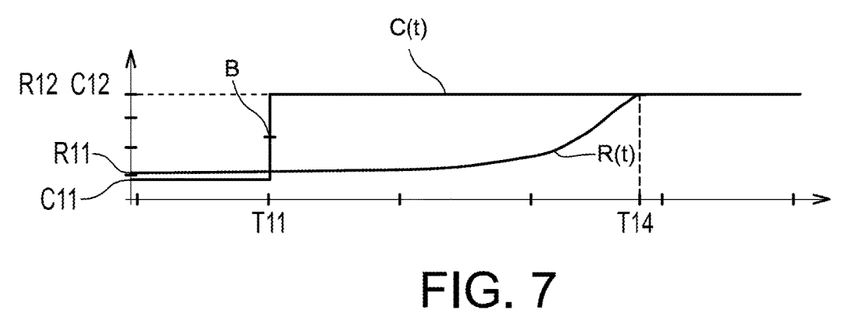
FIG. 7 shows an example set value and engine speed applicable for the method in FIG. 5, according to this invention.

FIG. 7 shows the engine speed and the applied set value corresponding to the example in FIG. 6, as a function of time. The engine speed is proportional to the engine thrust.

The throttle is actuated to apply a set value at time T11. The set value curve C(t) is equal to a first value C11 until time T11, and becomes equal to a second value C12 at time T11. The value C12 is greater than the set threshold B.

The engine speed is equal to a relatively low first value R11 until time T11 at which the order to fill the injection circuits with fuel is received, and then increases to a second value R12 higher than the first value, between times T11 and 114. The engine speed then remains equal to the second value R12. For example, the value R11 is equal to 2000 RPM, the value R12 is equal to 7000 RPM and the duration T14-T11 is equal to 7 seconds.

The invention claimed is:

1. A system of injecting fuel into the combustion chamber of an engine, comprising:
   two fuel circuits, one permanent flow circuit and one intermittent flow circuit, the intermittent flow circuit being drainable;
   fuel proportioning and distribution devices for proportioning fuel and distributing fuel between the two circuits, the fuel proportioning device and the fuel distribution device being connected in series, and the fuel distribution device being disposed downstream of the fuel proportioning device in a fuel flow direction such that the fuel proportioning device imposes the fuel flow supplied to the two fuel circuits together and the fuel distribution device distributes fuel between the two fuel circuits; and
   a controller,
   wherein when an order to fill fuel circuits with fuel after the circuit with intermittent flow has been drained is received at a first time value, the controller is adapted to
   control the proportioning and distribution devices to obtain a predetermined fuel flow higher than a fuel flow corresponding to the filling order delivered by the fuel proportioning device to the fuel circuit during a predetermined time duration from the first time value to a second time value and to supply a resulting surplus of fuel delivered by the fuel proportioning device to the intermittent flow circuit via the fuel distribution device by increasing and then decreasing a fuel distributing rate by the fuel distribution device during the predetermined time duration.

2. The fuel injection system according to claim 1, wherein the fuel proportioning and distribution devices comprise a fuel proportioning valve and a fuel distribution valve, the proportioning valve being designed to control the fuel flow output to the intermittent and permanent flow circuits, and the distribution valve being capable of distributing fuel between the intermittent flow circuit and the permanent flow circuit.

3. The fuel injection system according to claim 1,
   wherein, following the reception of the order to fill circuits with fuel after the intermittent flow circuit has been drained, the controller is further adapted to compare a received setpoint corresponding to the order to fill circuits with fuel with a set threshold, and if the setpoint is higher than the set threshold, control the proportioning and distribution devices to fill the intermittent flow circuit before reaching an engine thrust threshold corresponding to a predetermined fuel distribution between the permanent flow circuit and the intermittent flow circuit.

4. The fuel injection system according to claim 3, wherein the controller is adapted to determine the set threshold as a function of the engine thrust threshold, for a given point in the flight envelope.

5. The fuel injection system according to claim 3, wherein the controller is adapted to determine the engine thrust threshold as being the thrust point starting from which the intermittent flow circuit is used.

6. The fuel injection system according to claim 3, wherein the controller is adapted to determine the setpoint as a function of the position of the throttle actuated.

7. A method of injecting fuel into an engine combustion chamber, through an injection system comprising at least two fuel circuits, one permanent flow circuit and one intermittent flow circuit, the intermittent flow circuit being drainable; fuel proportioning and distribution devices for proportioning fuel and distributing fuel between the two circuits; and a controller, said method comprising:

receiving, at a first time value, an order to fill the circuits with fuel after the intermittent flow circuit has been drained; and controlling the proportioning and distribution devices to obtain a predetermined fuel flow higher than the flow corresponding to the filling order delivered by the fuel proportioning device to the fuel circuit during a predetermined time duration from the first time value to a second time value and supplying a resulting surplus fuel delivered by the fuel proportioning device to the intermittent flow circuit via the fuel distribution device by increasing and then decreasing a fuel distributing rate by the fuel distribution device during the predetermined time duration, wherein the fuel proportioning device and the fuel distribution device are connected in series, and the fuel distribution device is disposed downstream of the fuel proportioning device in a fuel flow direction such that the fuel proportioning device imposes the fuel flow supplied to the two fuel circuits together and the fuel distribution device distributes fuel between the two fuel circuits.

8. The fuel injection method according to claim 7, wherein, when the order to fill the circuits with fuel after the intermittent flow circuit has been drained is received, said method further comprising:

comparing a received setpoint corresponding to the order to fill circuits with fuel with a set threshold, and if the setpoint is higher than the set threshold, controlling proportioning and distribution devices to fill the intermittent flow circuit before reaching a thrust point threshold corresponding to a predetermined distribution of fuel between the permanent flow circuit and the intermittent flow circuit.

9. A non-transitory storage medium that can be read by a computer on which a computer program comprising instructions adapted to run the method according to claim 7, is stored.

* * * * *

UNITED STATES PATENT AND TRADEMARK OFFICE
CERTIFICATE OF CORRECTION

PATENT NO. : 10,072,578 B2  
APPLICATION NO. : 14/912523  
DATED : September 11, 2018  
INVENTOR(S) : Sebastien Chalaud Page 1 of 1

It is certified that error appears in the above-identified patent and that said Letters Patent is hereby corrected as shown below:

In the Specification

Column 6, Line 61, change: "between times T11 and 114" to --between times T11 and T14--;

Column 8, Line 6, change: "time 112 at which" to --time T12 at which--; and

Column 8, Line 18, change: "114. The engine" to --T14. The engine--.

Signed and Sealed this  
Twenty-sixth Day of November, 2019

Andrei Iancu  
*Director of the United States Patent and Trademark Office*